Sept. 20, 1955 C. H. W. CARTE 2,718,256
SEATS
Filed May 27, 1953 4 Sheets-Sheet 1

Inventor
Cecil Carte
per Worth Wade
Attorney.

Sept. 20, 1955     C. H. W. CARTE     2,718,256
SEATS

Filed May 27, 1953                   4 Sheets-Sheet 2

Inventor
Cecil Carte
per Worth Wade
Attorney.

Sept. 20, 1955   C. H. W. CARTE   2,718,256
SEATS
Filed May 27, 1953   4 Sheets-Sheet 3

Inventor
Cecil Carte
per Worth Wade
Attorney.

Sept. 20, 1955  C. H. W. CARTE  2,718,256
SEATS

Filed May 27, 1953  4 Sheets-Sheet 4

Inventor
Cecil Carte
per Worth Wade
Attorney.

United States Patent Office 2,718,256
Patented Sept. 20, 1955

2,718,256

SEATS

Cecil H. W. Carte, Folkestone, England, assignor to Martin Walter Limited, Folkestone, England Application May 27, 1953, Serial No. 357,714

Claims priority, application Great Britain September 2, 1952

7 Claims. (Cl. 155—7)

The present invention relates to improvements in and relating to seats.

It is directed to improvements in seat units, which can be readily converted into beds, settees and the like furniture, or stretcher carrying gear. It can be adapted for use in road vehicles such as commercial, military and private cars, ambulance bodies, ships' cabins, aircraft, household furnishings, or as portable chairs or beds.

A convertible seat unit according to the invention can be readily erected, stowed or removed, and can be made to any size and of any suitable material or combination of materials according to requirements.

An object of the invention is to provide seat units which can be readily converted with a minimum of effort into beds, longitudinal seats, settees or stretcher carrying gear, and can be readily stowed away or removed to give a maximum of space available for other purposes. The term "bed" hereinafter used is intended to cover settees and the like furniture, stretcher carrying gear and longitudinal seats.

The unit is readily stowed away to the side of a vehicle, aircraft, building or the like, by a simple hinged action, and can also be readily and completely removed and used as a chair or adapted as a bed in any other place or position.

By the present invention there is provided a seat unit convertible into a bed or longitudinal seat, characterized in that a back frame is connected to a seat frame by pivoted and link connections and the back frame is mounted to rotate about a mounting member so that movement of the seat unit from one position to the other is effected by a sequence of pivotal actions about different axes between the two frames to change their relative positions, coupled with a rotational movement of the back frame about the mounting member.

Also included in the invention is a combination of seat units, each unit comprising a back frame connected to a seat frame by pivoted and linked connections, the back frame being mounted for movement on a mounting member, the units being in tandem or one behind the other relationship so that when moved from inclined positions forming seats to horizontal positions they jointly form in combination a bed, stretcher carrying gear or longitudinal seat.

The accompanying drawings illustrate examples of carrying the invention into effect.

In the drawings:

Fig. 1 is a perspective view of a seat unit in a position for sitting thereon.

Fig. 2 a side elevation of the seat unit.

Fig. 3 a side elevation of the seat unit extended into a position serving as a bed or longitudinal seat.

Fig. 4 a detail view of the parts used to engage and support one unit with another.

Fig. 5 a detail view of the unit in a stowed position.

Fig. 6 a perspective view of a vehicle having four seat units in a position for setting thereon, and Fig. 7 a perspective view of a vehicle showing the four seat units according to Fig. 6 converted to form two beds or longitudinal seats.

Referring more particularly for details to Figs. 1 to 5 inclusive a seat unit comprises a base frame made up of angles 1 and tubes 2 and laced with springs 3 and steel strips 4 to give support for a cushion or squab 5.

The back frame is made up of angles 6 and tubes 7 and laced with springs 8 and steel strips 9 to give support for a cushion or squab 10.

The seat unit is mounted on a tube 11 which is adapted to rotate about a mounting arm 12, one end thereof being pivoted at 13 to a bracket 14 fixed to a side or other appropriate part of a vehicle or the like.

The principal movement of the seat unit from the seating position to the horizontal or bed position or longitudinal seat position is by means of the tube 11 rotating about the mounting arm 12 coupled with movements about pivot centres 15, 16, 28 and 32 and allied links and moving and sliding arms referred to later.

At the front of the seat base frame are brackets 17 carrying a leg 18 at pivot centres 19. The brackets have a series of indentations (not shown) which serves as location stops for the leg 18 when in an upright position or when folded parallel, or substantially so, to the angles 1. The leg is only able to pass, by a compression of a spring washer or the equivalent on the pivot centres 19 and this is done by the operation of the leg in its movements.

The brackets 17 may also carry additional legs 20 which may be desired and which are referred to later.

The seat frame has at each side a catch bracket 21 on a pivot centre 22 and is held to normal position by a spring 23. This catch serves the purpose of locking and holding legs 24 on the back frame by dowels 25 when the two frames are in a flat plane (see Fig. 3).

The rear of the base or seat frame carries ears 26 which connect with ears or members 27 on the back frame by pivot centres 28. This connection forms a joint between the two frames.

Arms 29 are also carried at the rear of the base or seat frame which in turn are pivoted at 16 to link arms 30 and controls the movement which positions the seat unit when in a horizontal plane.

At the rear of the back frame are secured brackets 31. Links or arms 33 are pivoted at 32 thereto. Each bracket 31 serves as a check plate into which the link arm 30 is forced and thereby locks the seat unit when in the inclined position.

The link arms 33 are joined together by a cross tie 34 and have extensions 35 which are pivoted at 15 to the link arms 30.

To allow the link arms 30 to slide up on the pivots 15 and engage the cheek plate referred to previously the link arms are slotted at 36.

The tube 11 is connected with the cross tie 34 by spaced blocks 37.

The length of the tube 11 in relation to the widths of the frames allows the seat unit to be moved in a transverse direction and also permits the unit to be positioned right or left handed as desired.

As previously stated the mounting arm 12 is hinged to bracket 14. One end of the arm 12 is closed and carries a swivel catch 38 pivoted at 39. This catch 38 retains the tube 11 on the arm 12. When the catch 38 is raised the tube 11 and the seat unit can slide off the arm 12.

The bracket 14 can be made of angle and flat metal sections or any suitable material and the pivot centre 13 provides for the stowage of the seat unit and for mounting it to any convenient part, say an inside ledge of a vehicle, aircraft, ship, building, or some other carrying part.

There will now be described the operation of a single seat unit commencing with the insertion into for example a motor vehicle van body.

Assuming that the mounting arm 12 and bracket 14 are already mounted on a ledge or some other convenient part of the vehicle, and that the seat unit is already in an inclined seating position.

*Positioning of seat unit.*—The tube 11 is placed so that the swivel catch 38 is just inside one end thereof. The tube 11 is then slid on to the arm 12, the catch 38 automatically adjusting itself around pivot 39 allowing the tube 11 to slide into position beyond the said catch, which by reason of its own weight drops back into locking position when the end of the tube 11 passes this and thereby retains tube 11 on arm 12.

The seat unit can then be moved in a transverse direction along the arm 12 from the centre of the vehicle body to the side thereof and vice versa.

*Support of seat unit in an inclined position.*—The seat unit is maintained in its inclined position by reason of the support given to it by the rear legs 24 and front leg 18. It is also assisted by contact with the mounting arm 12 and bracket 14. Any forward movement is prevented by the pressure exerted on the seat base frame causing the arms 29 to revolve backwards around pivot centres 28 and causing the link arms 30 by reason of the slots 36 therein to slide up and be locked under catch or check plate 31.

*To move seat unit from inclined position to horizontal position.*—The seat base frame is raised at its front end so as to cause it to turn on pivot centre 28 thereby causing each arm 29 to withdraw its co-operating link arm 30 from the catch plate 31. Still holding the front of the seat base frame this is pulled forwardly and upwardly.

This forward movement causes the links or arms 33 and the tube 11 to revolve forwardly around the mounting arm 12 on an axis 40, the arms 33 acting through the pivot centres 32 and brackets 31 causes the two frames to travel forward and finally come to rest in a flat, or substantially flat, plane with the top of the back frame approximately close to the mounting bracket 14 (see Fig. 3).

This economy in movement room or compactness allows the seat unit to be positioned close to the rear doors 41 of a vehicle, thereby allowing for a further unit or units in front. The movements can be carried out without any removal of cushions or squabs.

As the two frames approach the same plane the dowels 25 on the legs 24 make contact with the catches 21 and by expansion of the springs 23 the catches move about the pivot centres 22 and finally hold the dowels firmly locked.

In some cases where the floor is stepped additional legs 20 may be provided so that the front of the seat is firmly supported on the lower step. These additional legs may normally lie parallel or substantially so with the frame and be locked in that position and swing round on pivots 43 on brackets 17 to upright positions as shown in Fig. 3. Locking means for the legs may be provided.

*Stowed position of seat unit.*—As shown in Fig. 5 the seat unit may be stowed to the side or some other appropriate part of the vehicle body by first raising and locking any legs which are in the upright position and then raising the whole unit causing the mounting arm 12 to swing around pivot centre 13 on the bracket 14. As the unit and mounting arm is raised about the pivot centre 13 the seat unit will automatically slide on the arm 12 and come to rest on the mounting bracket 14.

Suitable means are provided for holding the seat unit in the stowed position against the side of the vehicle.

*Movement of unit from stowed to inclined or horizontal positions.*—This is carried out by reversing the order of movements described in the earlier paragraphs.

If head room is available the seat unit may be stowed away in its extended or horizontal position.

It will be seen from Figs. 3 and 4 that when the seat units are placed in tandem only one leg is necessary for support when the seat units are in a horizontal position as the rear of one unit supports the front of the other. The reference numeral 42 denotes flat shaped sections fitted to the top of the back frame of the front seat unit and 43 angles and hooked sections fitted to the front or seat frame of the rear seat unit. The front seat unit is erected first followed by the rear one. As the latter approaches the horizontal plane the sections 43 engage the sections 42 in a dovetail action and the seat units are drawn and locked together and the necessary support is given from one unit to the next. The units can then if so desired be stowed away in one complete section.

Assuming by way of example only that four of the seat units are fitted in a motor van it is clear that various dispositions thereof are available and some of these are as follows:

Placed four square in the body of the van to the rear of the driver, and each unit close to the body side, they provide four single inclined seats with a centre gangway down the vehicle.

Figure 1:
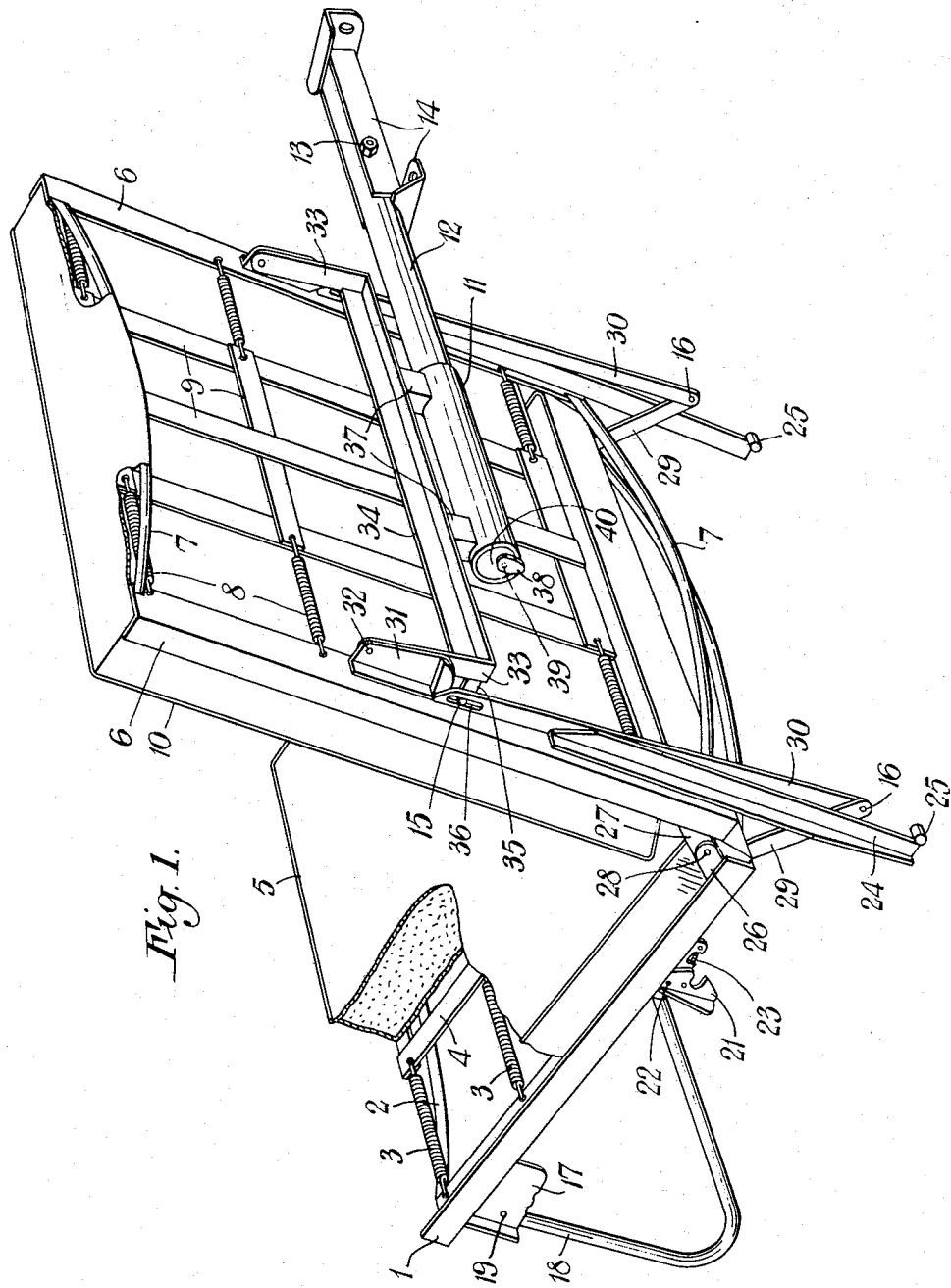
Figure 2:
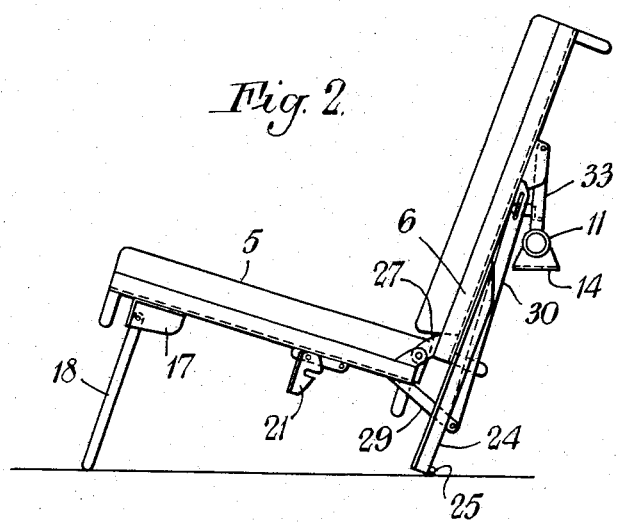
Figure 4:
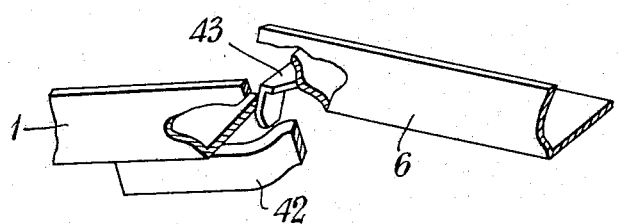
Figure 5:
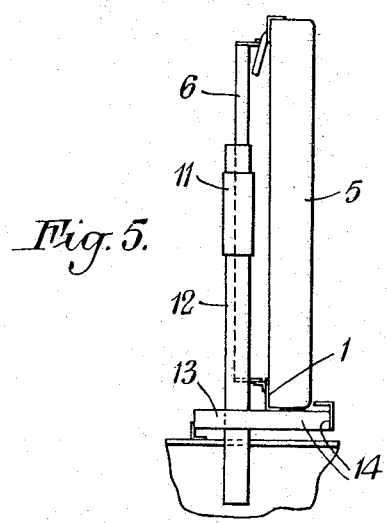
Figure 3:
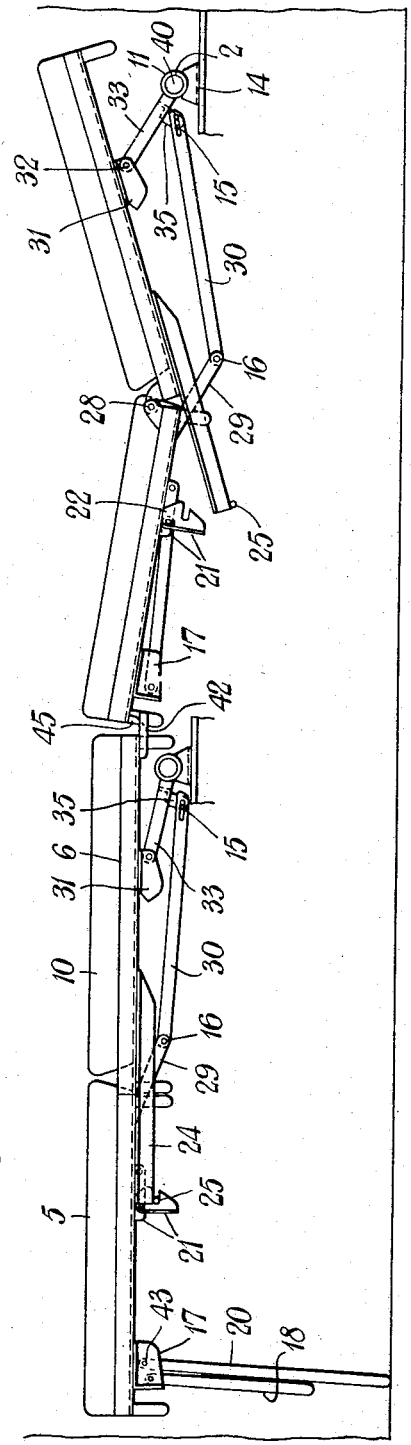
Figure 6:
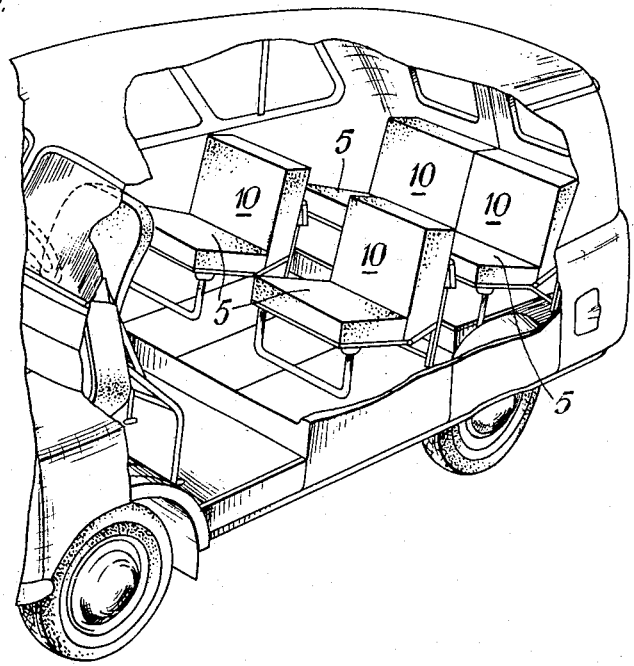
Fig. 6 shows an example of lay-out having four seat units, the pairs of seats being arranged tandem fashion, the front seat units providing two single seats with a centre gangway, each seat being close to the body vehicle side, and one back seat unit being close to the side and the other back seat unit having been moved transversely to form together a large bench like seat.

If the two front seat units and/or the two rear seat units are moved transversely together large bench type seats are produced as indicated in Fig. 6.

Figure 7:
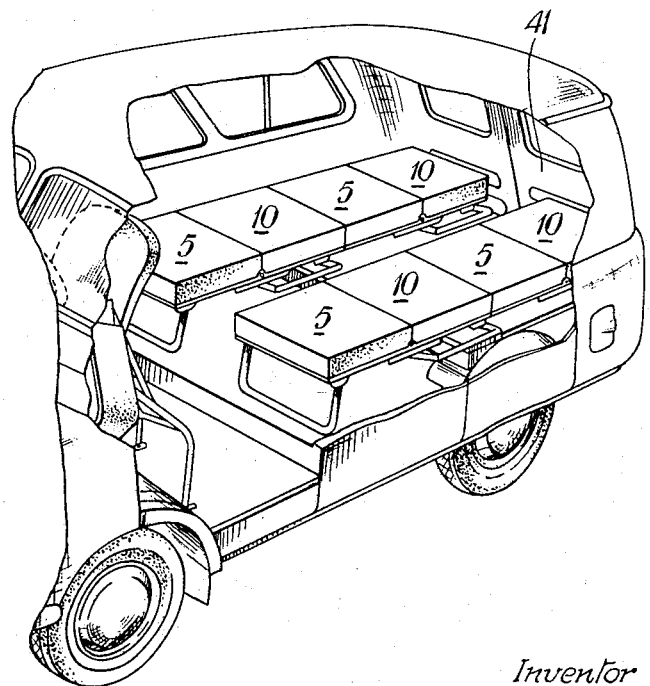
Fig. 7 shows the seats in a horizontal position and forming two beds or longitudinal seats.

If two seat units in longitudinal order are brought to an horizontal plane, joined together with suitable catches and supported by such means as a ledge or stand or with a leg at one end, a full length single bed or longitudinal seat is formed, leaving two seats on the other side. Alternatively two full length single beds can be formed (see Fig. 7) and if moved together transversely a large double bed is made. The mattress in all cases is automatically formed without in many cases any adjustment by the squabs and cushions of the seats.

The seat units can be stowed to the side of the body thus giving a clear floor space for goods or other purposes.

When the cushions are removed from the seats, either one or two stretcher carrying gears are produced, the seat side angles providing the necessary runners for the stretcher wheels.

The loading of the stretcher may be facilitated by the gear being moved from the van body side after this is opened up, so far as the transverse movement allows, the stretcher can then be mounted clearing all obstructions such as open rear doors or corner pillars and on being mounted the whole is moved in to the side of the van body leaving a centre gangway. If only one gear is used the other two units can be used as passenger or attendant's seats or they could again be brought (either or both) to the horizontal plane, and used for a larger number of sitting case patients.

If the two front seat units only are used the rear ones can be stowed or removed and the body space is available for goods, and vice versa.

Any or all of the seat units can easily be removed giving full use of vehicle as a goods van and each seat unit can be used as a chair distinct from its uses in the van body, also as a bed or settee.

Each seat unit is complete in itself and functions as such and the aforegoing uses are by way of examples only.

All the seat units are fully interchangeable and easily removed from their mountings.

The same condition of transverse movement is available whether the seat units are in the inclined sitting position, longitudinal seats or in a bed position.

It will be noted that the beds are raised above the floor of the vehicle.

It will be apparent that the invention can be variously modified and changed within the scope of the appended claims.

I claim:

1. A seat unit convertible into a bed or longitudinal seat, comprising in combination, a seat frame, a back frame, pivoted joints between said frames, arms attached towards the rear of the seat frame, link arms pivoted at their one ends to said arms, further arms pivoted at their one ends to the back frame and pivotally connected at their other ends to the other ends of the link arms, a fixed mounting member located intermediate of the upper and lower ends of the back frame and independent of the seat unit, means for rotatably mounting the back frame on said mounting member, and means for holding the frames in position, whereby movement of the two frames from one position to the other is effected by a sequence of movements about the said different pivotal axes coupled with a rotational movement of the back frame about the fixed mounting member.

2. A seat unit convertible into a bed or longitudinal seat, comprising in combination, a seat frame, a back frame, pivoted joints between said frames, arms attached towards the rear of the seat frame, link arms pivoted at their one ends to said arms, brackets fixed to the back frame, further arms pivoted at their upper ends to said brackets and pivotally connected at their lower ends to the other ends of the link arms, a fixed mounting member located intermediate of the upper and lower ends of the back frame and independent of the seat unit, a tube carried on the back frame for rotatably mounting the latter on said mounting member, and means for holding the frames in position, whereby movement of the two frames from one position to the other is effected by a sequence of movements about the said different pivotal axes coupled with a rotational movement of the back frame about the fixed mounting member.

3. A seat unit convertible into a bed or longitudinal seat, comprising in combination, a seat frame, a back frame, pivoted joints between said frames, arms attached towards the rear of the seat frame, slotted link arms pivoted at their one ends to said arms, brackets fixed to the back frame, further arms pivoted at their upper ends to the said brackets and pivotally connected at their lower ends to the other ends of the link arms, the brackets serving as check plates for said link arms, a fixed mounting member located intermediate of the upper and lower ends of the back frame and independent of the seat unit, means for rotatably mounting the back frame on said mounting member, and means for holding the frames in position, whereby movement of the two frames from one position to the other is effected by a sequence of movements about the said different pivotal axes coupled with a rotational movement of the back frame about the fixed mounting member.

4. A seat unit convertible into a bed or longitudinal seat, comprising in combination, a seat frame, a back frame, pivoted joints between said frames, arcs attached towards the rear of the seat frame, link arms pivoted at their one ends to said arms, brackets fixed to the back frame, further arms pivoted at their upper ends to the back frame and pivotally connected at their lower ends to the other ends of the link arms, a cross tie joining said further arms, spaced blocks on said cross tie, a fixed mounting member located intermediate of the upper and lower ends of the back frame and independent of the seat unit, a tube secured to the spaced blocks for rotatably mounting the back frame on said mounting member, and means for holding the frames in position, whereby movement of the two frames from one position to the other is effected by a sequence of movements about the said different pivotal axes coupled with a rotational movement of the back frame about the fixed mounting member.

5. A seat unit convertible into a bed or longitudinal seat, comprising in combination, a seat frame, a back frame, pivoted joints between said frames, arms attached towards the rear of the seat frame, link arms pivoted at their one ends to said arms, further arms pivoted at their one ends to the back frame and pivotally connected at their other ends to the other ends of the link arms, a mounting member located intermediate of the upper and lower ends of the back frame and independent of the seat unit, a fixing bracket adapted to be fixed to a part of a vehicle and to which said member is pivoted, means for rotatably mounting the back frame on said mounting member, and means for holding the frames in position, whereby movement of the two frames from one position to the other is effected by a sequence of movements about the said different pivotal axes coupled with a rotational movement of the back frame about the fixed mounting member.

6. Multiple seat units according to claim 5, wherein the units are arranged in tandem.

7. Multiple seat units according to claim 5, wherein the units are mounted on a common mounting member so as to have a longitudinal sliding movement thereon.

References Cited in the file of this patent

UNITED STATES PATENTS

| | | |
|---|---|---|
| 637,976 | Rolph | Nov. 28, 1899 |
| 1,747,717 | Hummert | Feb. 18, 1930 |
| 2,039,682 | Clarke et al. | May 5, 1936 |
| 2,596,750 | Wickham et al. | May 13, 1952 |
| 2,602,486 | Battles | July 8, 1952 |
| 2,655,197 | Schofield | Oct. 13, 1953 |

FOREIGN PATENTS

| | | |
|---|---|---|
| 173,345 | Switzerland | Nov. 30, 1934 |